(12) United States Patent
Oattes

(10) Patent No.: US 12,554,702 B2
(45) Date of Patent: *Feb. 17, 2026

(54) SYSTEMS AND METHODS FOR QUERY TROUBLESHOOTING

(71) Applicant: Kobai, Inc., San Ramon, CA (US)

(72) Inventor: Ryan Oattes, Burlington (CA)

(73) Assignee: Kobai, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,934

(22) Filed: Jul. 31, 2024

(65) Prior Publication Data

US 2025/0147947 A1 May 8, 2025

Related U.S. Application Data

(63) Continuation-in-part of application No. 17/551,989, filed on Dec. 15, 2021, now Pat. No. 12,079,212.

(51) Int. Cl.
*G06F 16/23* (2019.01)
*G06F 16/2452* (2019.01)

(52) U.S. Cl.
CPC ...... *G06F 16/2365* (2019.01); *G06F 16/2452* (2019.01)

(58) Field of Classification Search
CPC . G06F 16/2365; G06F 16/2452; G06F 16/248
See application file for complete search history.

(56) References Cited

U.S. PATENT DOCUMENTS

| 5,721,901 A | 2/1998 | Banning et al. |
| 2005/0187911 A1 | 8/2005 | Tunning |
| 2020/0210857 A1 | 7/2020 | Goradia et al. |

OTHER PUBLICATIONS

Beckett, David, "RDF 1.1 N-Triples a line-based syntax for an RDF graph", Beckett, D. (Feb. 25, 2014). RDF 1.1 N-Triples a line-based syntax for an RDF graph. RDF 1.1 N-Triples. https://www.w3.org!TR/n-triples/, Feb. 25, 2014.
International Search Report and Written Opinion of PCT/US2022/081650 dated Mar. 16, 2023.
Vartak et al., Towards Visualization Recommendation Systems, Sigmod Records, ACM, New York, vol. 45, No. 4, pp. 34-39 (2017).

*Primary Examiner* — Albert M Phillips, III
(74) *Attorney, Agent, or Firm* — HG LAW LLP

(57) ABSTRACT

Systems and methods are disclosed for creating a query visualization. A system receives an input of a query, with semantic classes, attribute and links for the semantic classes, wherein the semantic model data structure maps the at least one attribute a source data structure. The system generates for display a visual representation of the query. The system accesses the at least one source data structure mapped to the at least one attribute to compute at least one statistic score based on calculating a number of records in the at least one source data structure comprising a value for the at least one attribute. The system then modifies the visual representation of the query based on identifying a problematic attribute in the query based on the at least one statistic score.

14 Claims, 12 Drawing Sheets

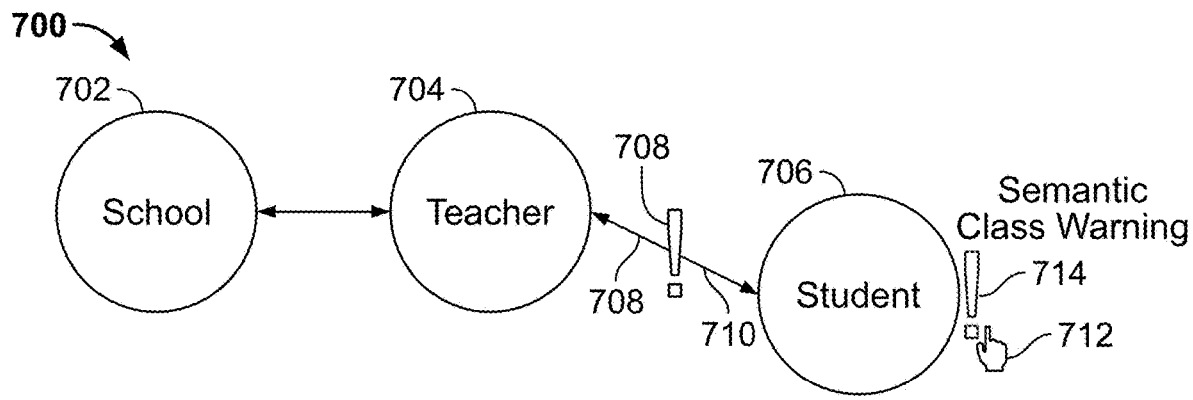
FIG. 7A
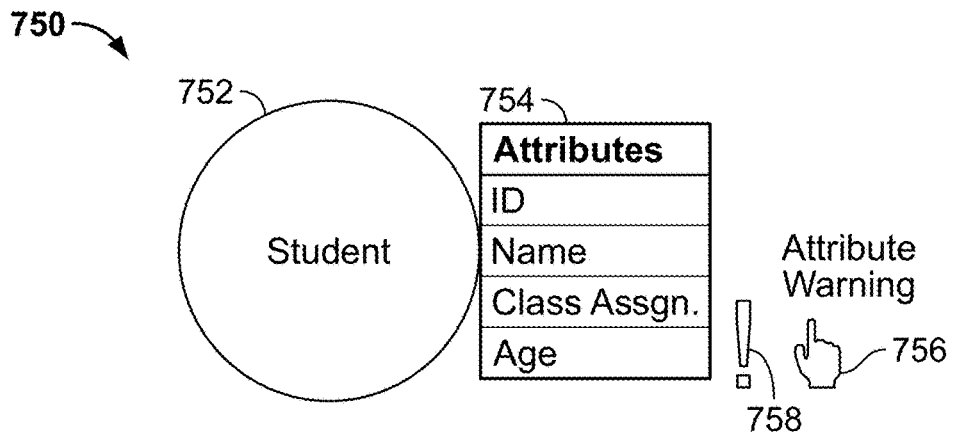
FIG. 7B
FIG. 7C

SYSTEMS AND METHODS FOR QUERY TROUBLESHOOTING

CROSS-REFERENCE TO RELATED APPLICATIONS

This patent application a continuation of U.S. patent application Ser. No. 17/551,989 filed Dec. 15, 2021, which is hereby incorporated by reference herein in its entirety.

BACKGROUND

The present disclosure relates to an automated determination of faults in a database search query and to user interface presentation of the determined faults.

SUMMARY

Modern computerized search systems provide user interfaces that allow for a search of traditional data sources or data structures (e.g., databases stored on one or more servers). For example, data sources may be searched for records matching certain properties. The reliance on the traditional unwieldy data structures to store data (e.g., lists or tables of records) requires the use of very basic search tools to find the required information. For example, a single search query (e.g., an SQL query) may be configured via a user interface to aggregate (e.g., with combination function) several data sources, and then perform a selection of records that match selected parameters. In particular, traditional data sources are commonly are forced to be tabular (e.g., formatted as a table) due to use of traditional data source technology. In one approach, the tables are used because they make efficient use of physical data carriers (e.g., hard drives), without consideration of how the data may be used in a real-world environment. In one example, an enterprise resource planning system may simply store data in tables that correspond to how it captures that data (e.g., a form questionnaire or a purchase order data may be translated directly into table form). However, while such data collection is easy, such a naïve technique creates serious obstacles when the data needs to be analyzed or searches.

In some implementation, search queries need to be constructed in case by cases to operate over naively created data structures. However, it is often difficult or impossible to troubleshoot the query. This is exacerbated by the need for the traditional search queries to refer directly to specifics of the underlying data structures. For example, it may not be clear why the query returns no results, very small number of results, or results that are unexpected in light of the input. In particular, it may not be immediately apparent which one of the data sources was responsible for the query fault. In one approach, to identify the problem, it may be necessary to manually review each of the data structures that were invoked by the search query. This approach is cumbersome and time consuming because the manual review of the data structures does not make it apparent which portion of the query references the problematic data structure.

In another approach, a number of smaller queries is manually created to identify the data structure where the problem occurred. For example, smaller queries may be created by taking a combination of less than all data sources or by not performing a combination at all. In another example, smaller queries may be created by reducing the number of looked-up properties or by checking each property one by one. Each one of the smaller queries must be tried in succession to identify the part of the query that lead to problematic results. This process is cumbersome and time consuming due to the need to generate and sequentially check smaller queries. The repeated input and resulting processing of smaller queries unnecessarily consumes additional network and processing resources as the server performs multiple look-ups and transmits them over a network to a search client.

To solve these problems, system and method are provided that leverage a semantic data structure (e.g., a semantic graph) that is defined to overlay and organize disparate traditional data sources within a semantic model that is then linked to traditional data sources. In particular, the semantic model data structure may define multiple semantic classes (which may be connected to each other) and one or more attributes for each semantic class. Each attribute may then be mapped to one or more of the traditional data sources (e.g., a tables or database entries). Exemplary implementations for creating such a semantic models that overlays the traditional data sources are further described in U.S. Patent Application Publication No. 2020/0210857 ('857 Publication) which is herein incorporated by reference in its entirety. Beneficially, while the semantic classes rely on traditional data sources, they create a useful uniform abstraction that removes the need for each query to reference specifics of each underlying data source.

Once the semantic model data structure is defined, search queries may be inputted by user interface selection of one more of the semantic classes and selection of filters based on attributes defined for those semantic classes by the semantic model data structure. Troubleshooting for such a query may then be performed in a way that overcomes the problems of searching traditional data structures. In particular, the techniques described herein and below allow for automatic analysis of all relevant data sources mapped to attributes and connections of the query and generation of a visual overlay that precisely identifies the problematic part of the query.

In some embodiments, the search system may receive an input of a query, wherein the query comprises a plurality of semantic classes, and a plurality of attributes for each of the plurality of semantic classes. The search system then generates for display a visual representation of the query leveraging the data stored in the semantic model data structure. The visual representation may include an identifier for each semantic class (e.g., an icon with a title of the semantic class). The visual representation may also include one or more visual links between connected semantic classes (e.g., an arrow may be drawn between the semantic class icons). The visual representation may also include an identifier for each of the plurality of attributes (e.g., each semantic class icon may include sub-icons that list the relevant attributes of that semantic class).

Once the query is received, the search system may leverage the semantic model to access each respective data source mapped to each respective attribute of the query. A statistic score may be computed for each data source (e.g., the search system may compute a number of data records of the data source that has values for the respective attribute). Based on the statistic scores computed for each attribute of the plurality of attributes, the search system may identify a problematic data source and a problematic attribute mapped to that data source. The search system may further identify a semantic class of the query associated with the problematic attribute. Additionally, or alternatively, a statistic score may be computed for each semantic class and for each attribute. Additionally, or alternatively, statistic score may be computed for each combination of attribute and data source (e.g., statistic score may be computed that reflects what percentages of attribute values come from each data source).

In some embodiments, statistic scores may be pre-computed in advance. For example, the search system may maintain storage (e.g., sematic store) of pre-computed statistical data. In one approach, statistic scores may be calculated (and stored) during the process of construction of modification of the semantic model (e.g., during ingestion of data sources into the semantic using techniques describe below). In some embodiments, the statistic scores may be computed during initial ingestion of data into the semantic model. The statistic scores may also be updated as more data is added into the semantic model and/or at periodic intervals. Advantageously, the sematic store may store the pre-competed statistic scores in way that is easy to retrieve (e.g., statistic scores may be linked from semantic class data and attribute data of the semantic model)

Once the query fault is identified, the search system may modify the display of the visual representation of the query to highlight or visually distinguish a part of the query that is responsible for a fault in the query. For example, the search system may generate for display a visual overlay over the visual representation of the query to identify the problematic semantic class. For example, the problematic semantic class may be visually distinguished from the other semantic classes. In one embodiment, a warning icon may appear over the problematic semantic class. The warning icon may visually or textually identify the problematic attribute. In some embodiments, the warning icon may also appear over a problematic connection between two semantic classes. Advantageously, using the approach described above, the search system may automatically perform evaluation for all data sources mapped to all attributes and connections of the constructed query and visually identify the problematic part of the query. The indication of the problem areas of the query allows for quick and easy resolution of the underlying problem (e.g., by prompting a creation of a mapping of a different data set to the problematic attribute or connection).

In one example, the semantic model data structure referenced above may define a semantic class ("student") which may be added to the semantic model. Once a semantic class is added it may be linked to other semantic classes (e.g., semantic class "student" may be linked to semantic class "teacher" with relationship marked as "studies under"; the semantic class "teacher" may also be linked a semantic class "school" with relationship marked as "works in"). Each semantic class may be configured to have one or more attributes. For example, a semantic class "student" may be configured to include attributes of "age," "student ID," etc. The data defining the attributes may be mapped from traditional data sources (e.g., tables, databases, etc.). Notably, each attribute may be mapped to more than one data source (e.g., student age may be mapped to tables listing ages for the students). This allows for creation of queries which may query for a single filter (e.g., student age) from multiple data sources, even if the underlying data structures list "age" in different way (e.g., one data source may store age in a column labeled "student_age" while another may have a column labeled "STDNTAGE").

Once the semantic model is defined using the semantic model data structure, a user interface is used to construct queries by selecting semantic classes and selecting a subset of associated attributes (e.g., a query can be constructed to check for teachers who have students over the age of 10). In one example, the query includes several semantic classes (e.g., semantic classes "student" and "teacher"), where some semantic classes are linked by one or more relationships (e.g., a "student" may be linked as studying under a "teacher."). In some scenarios, one or more attributes are selected for each semantic classes. For example, an attribute "age" is selected for a semantic class "student." In one approach, filters for the attribute are defined (e.g., the attribute "age" may be filtered for ages higher than 10). After the query is configured, the search system generates an output (e.g., a list of teachers who have students over the age of 10) using the semantic data structure and the data sources mapped to the attributes.

When the troubleshooting techniques, described above and below, are applied to this query, the search system may determine that the data source mapped to the "age" attribute of the semantic class "student" is problematic because it provides ages only for 5% of the students (which may be below the threshold of 30%). In this case, the attribute "age" is identified as problematic, which may indicate that the semantic class "student" is also problematic. The search system may then modify the visualization of the query, e.g., by highlighting the icon "student," by overlaying it with a warning notice stating: "problem detected with attribute age." The search system may also visually indicate which data source is problematic. In another embodiment, the search system may indicate that a connection between semantic classes is problematic (e.g., because a data source that defines which students study under which teacher only has teacher/student link data for 10% of the students which may be below the threshold of 40%). In this case, a warning overlay may be generated over the connection between a semantic class "student" and a semantic class "teacher." One skilled in the art would appreciate that any other suitable statistic scores or combination of statistic scores may be used instead or in addition to a computation of percentage of valid values. Further examples of such statistic scores are provide below (e.g., in relation to FIGS. 4-6).

In some embodiments, a data source fault may be caused by a polarity problem. For example, different data sources for a certain attribute may have different semantic class instance identifiers (e.g., with some identifiers being improper). For example, one data source may key student data by their student ID, another data source may key student data by their phone number, while yet another data source may improperly key students by their first name (which may be shared by more than one student). In another example, one data source may key students by their social security number while another source may key students by their student ID. While both ways are valid, such inconsistency may create an overlap when every student is counted twice. In some embodiments, the search system may identify a query fault by identifying a data source with records (e.g., records used as semantic class instance identifiers) that do not match other records. For example, a data source that keys students by the first name will have starkly different relevant records than data sources that key students by the student ID. The term "polarity problem" refers herein to a problem of multiple versions of a semantic class instance being created that represent the same real-world concept. For example, if one semantic class instance was created for a student based on their social security number and another semantic class instance was crated for the same student based on their student ID, the polarity problem may exist for semantic class "Student." In some implementations, when such a query fault is detected, the search systems generates for simultaneous display sample records from the problematic data source, and a sample record from another data source to provide evidence of a polarity problem and prompt revisions (e.g., by changing which key is used in the problematic data source).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 7A shows an exemplary user interfaces for displaying a query, in accordance with some embodiments of the disclosure;

FIG. 7B shows another exemplary user interfaces for displaying a query, in accordance with some embodiments of the disclosure;

FIG. 7C shows another exemplary user interfaces for displaying a query, in accordance with some embodiments of the disclosure;

DETAILED DESCRIPTION

Figure 1:
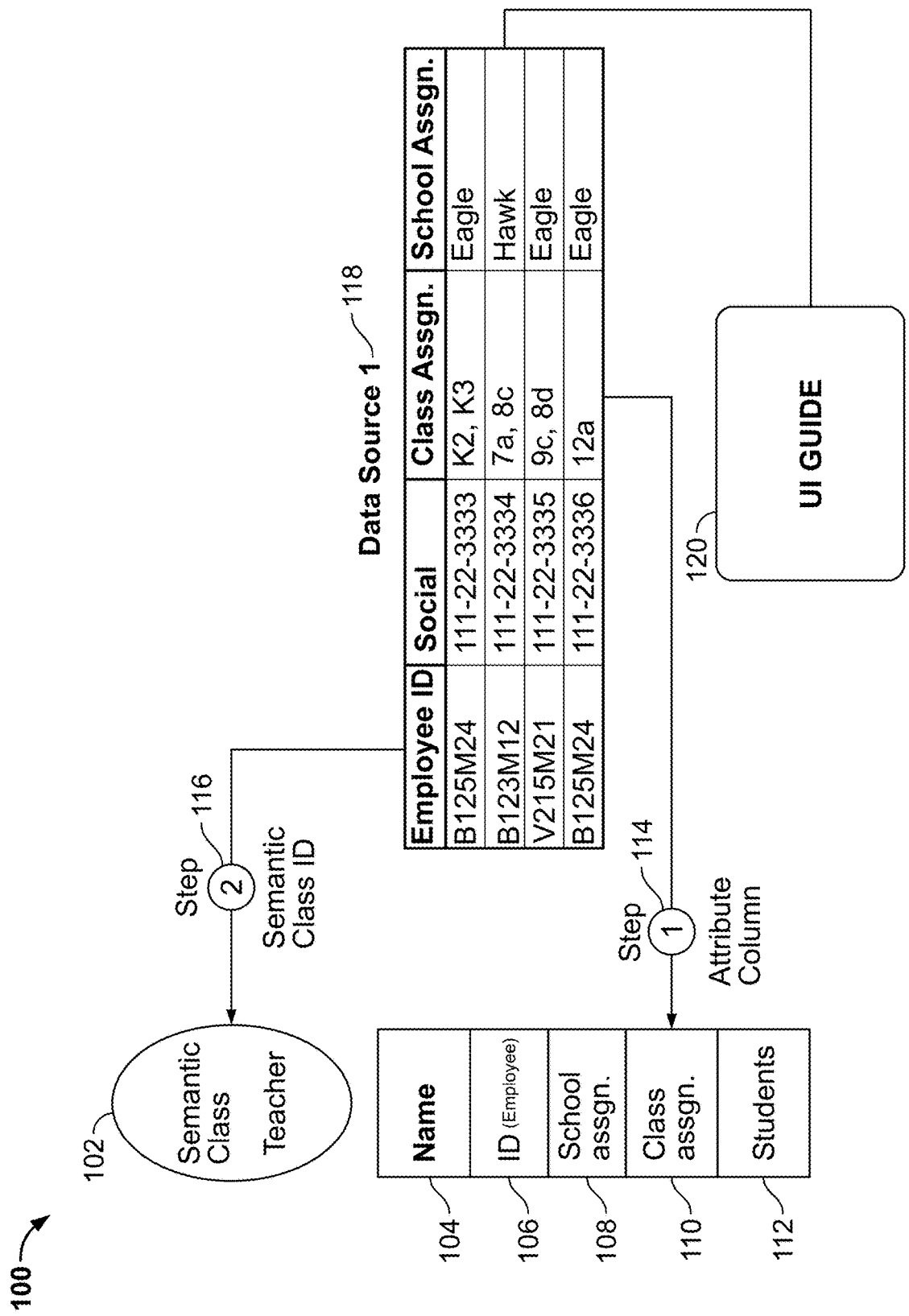
FIG. 1 shows an illustrative mapping process for creating a semantic overlay data structure, in accordance with some embodiments of the disclosure.

FIG. 1 shows an illustrative mapping process 100 for creating a semantic overlay data structure, in accordance with some embodiments of the disclosure. In some embodiments, the mapping process may be performed by a Data Processing Application (the DPA). In one approach, the DPA is embodied in a set of instructions stored in non-volatile memory of a single server or in a set of servers acting in parallel (e.g., in a distributed computing environment). The processors of the server or servers execute the intrusions stored in non-volatile memory to enable the operation of the DPA. The DPA may interface with data stored locally or on a remote device or devices accessible via at least one network.

The systems and methods performed by the DPA described herein generate and use a semantic overlay data structure (which may also be referred to as a semantic model) that provides a level of abstraction for traditional data sources (e.g., tables, database, lists) such as first data source 118. The method of creating overlay data structures is described in more detail in the '857 Publication. For example, first data source 118 may comprise a table listing data for teachers in a school district. As shown, first data source 118 includes several columns for multiple teachers, such as social security number, class assignment, school assignment, etc. One skilled in the art would appreciate that such a table may include any suitable number of columns tracking any suitable data for teachers in the school districts. In some embodiments, rows may be used to track data instead of or in addition to columns.

The DPA may operate to ingest first data source 118 (and any other traditional data sources) into a semantic overlay data structure. The semantic overlay data structure may define a plurality of semantic classes (e.g., "teacher," "school," "student"). Some exemplary semantic classes are further shown, e.g., in FIG. 3 of the present disclosure. Each semantic class may comprise a list of attributes. For example, the semantic class "teacher" 102 may comprise a name attribute 104, ID attribute 106, school assignment attribute 108, class assignment attribute 110, and students attribute 112. One or more of the attributes may be connection to other semantic classes. For example, the "students" attribute 112 may be a link to one or more semantic classes' instances of the semantic class "Student" (e.g., by linking to an ID of those instances). Similarly, the "school assignment" attribute 108 may be a link to one or more semantic classes' instances of the semantic class "School." The semantic overlay data structure may be defined and stored as a graph data structure that identifies every semantic class in the model and indicates all connections between the semantic classes (e.g., as edges between nodes of a graph). The semantic overlay data structure may also define the list of attributes for every semantic class (e.g., as data stored in association with each node of the data structure). The semantic overlay data structure may be incrementally defined using User Interface (UI) Guide 120 (e.g., as further described in the '857 Publication). For example, the user interface input from UI guide 120 may create a number of nodes, name the nodes, and draw connections between the nodes. The user interface input from UI guide 120 may then be used to define attributes for each node (e.g., by clicking a node and inputting names of the attributes).

Each semantic class in the model may be associated with multiple instances of that semantic class. For example, as shown, four instances of semantic class "teacher" 102 may be created by the system based on four teachers being listed in the first data sources. Advantageously, instances of semantic class "teacher" 102 may also be created based on any number of traditional data sources. Each instance of semantic class "teacher" 102 may be assigned a semantic class instance ID. Such instance ID may be used by the search system to uniquely identify each class instance. Because instance ID uniquely identify each class instance such IDs may further be used to create unique links between semantic class instance (e.g., a link from an attribute may be defined to point to another semantic class instance, for example by storing ID of the linked semantic class instance as one of the attributes).

Once the structure of the semantic overlay data structure is defined, data from one or more data sources (e.g., first data source 118) may be ingested into the semantic overlay data structure (e.g., to create sematic class instances for each defined sematic class). The ingestion process may be assisted using UI guide 120. For example, items in columns of first data source 118 are mapped to semantic class attributes 104-112. The user device that interfaces with the DPA may be prompted by UI guide 120 to perform the mapping. For example, UI Guide 120 may guide selections of data for attributes of semantic class 102. FIG. 1 illustrates an exemplary 2-step data mapping using UI guide 120. In one example, first step 114 corresponds to a selection of at least one column from a data source 118 (e.g., class assignment column) to provide attribute values for a selected attribute (e.g., attribute 110). Second step 116 corresponds to identifying the appropriate semantic class and appropriate attribute for the that class that is to be mapped to that column. Steps 114 and 116 may be performed in any order or at the same time.

In another alternative approach, the data is ingested from one or more data sources (e.g., first data source 118) into the semantic overlay data structure only when a query is received. In this approach, the sematic classes, attributes, and connections between the sematic classes may be defined ahead of time, however the actual instances of the classes may be generated in real time when required (e.g., when a query if formed, such as at element 304 of FIG. 3). In some embodiments, a hybrid approach may be used, e.g., some data sources may be ingested ahead of time, while other data is ingested as needed.

For example, the illustrated example shows a mapping of "Class Assignment" attribute 110 in the semantic overlay data structure to the "Class Assgn" column in the Data Source 118 source table. In this example, a user interface can be used to drag "Class Assignment" attribute 110 over the "Class Assgn" Column of Data Source 118. In one embodiment, the user interface displays a prompt to identify how Data Source 118 relates to the semantic class "Employee" 102 in the overlay data structure. For example, the user interface may generate a prompt to indicate how each employee is uniquely identified in Data Source 118. In this case, the "Employee ID" column may be selected as unique identifier of Sematic Classes "Teacher" instances (which may match "ID" attribute 104). In this way columns of the first data source 118 may be mapped to attributes of instances of semantic class 102. One skilled in the art would appreciate that this process may be performed for any number of data sources and for any attributes of any number of defined semantic class. For example, different columns of many different data sources may be mapped to attributes of semantic classes "teacher," "school," and "student." In some embodiments, multiple columns of multiple data sources are mapped to the same attribute of the same semantic class. In some embodiments, the mapping may also define relations to other instances of other semantic classes. For example, the attribute "school assignment" may be mapped to instances of a semantic class "school" when a connections is defined between semantic class "teacher" and semantic class "school."

In some embodiments, the ingestion of data from first data source 118 to the semantic overlay data structure that includes semantic class 102 is accomplished by the DPA creating and updating a triplestore purpose-built database for the storage and retrieval of data through semantic queries. For example, the DPA may create triples (which may also be referred to as "triads" or "3-tuples") based on ingestion of data. For example, triples (e.g., triples suitable for SPARQL Protocol and RDF Query Language (SPARQL)) may include, for each instance of an attribute: unique id of concept instance to which it belongs, the name of the attribute, the value of the attribute. The triples may then be indexed and used for fast data retrieval. For example, the triples may be data triples defined by W3C RDF 1.1 N-Triples specification (https://www.w3.org/TR/n-triples/) which is herein incorporated into this document in its entirety.

Figure 2:
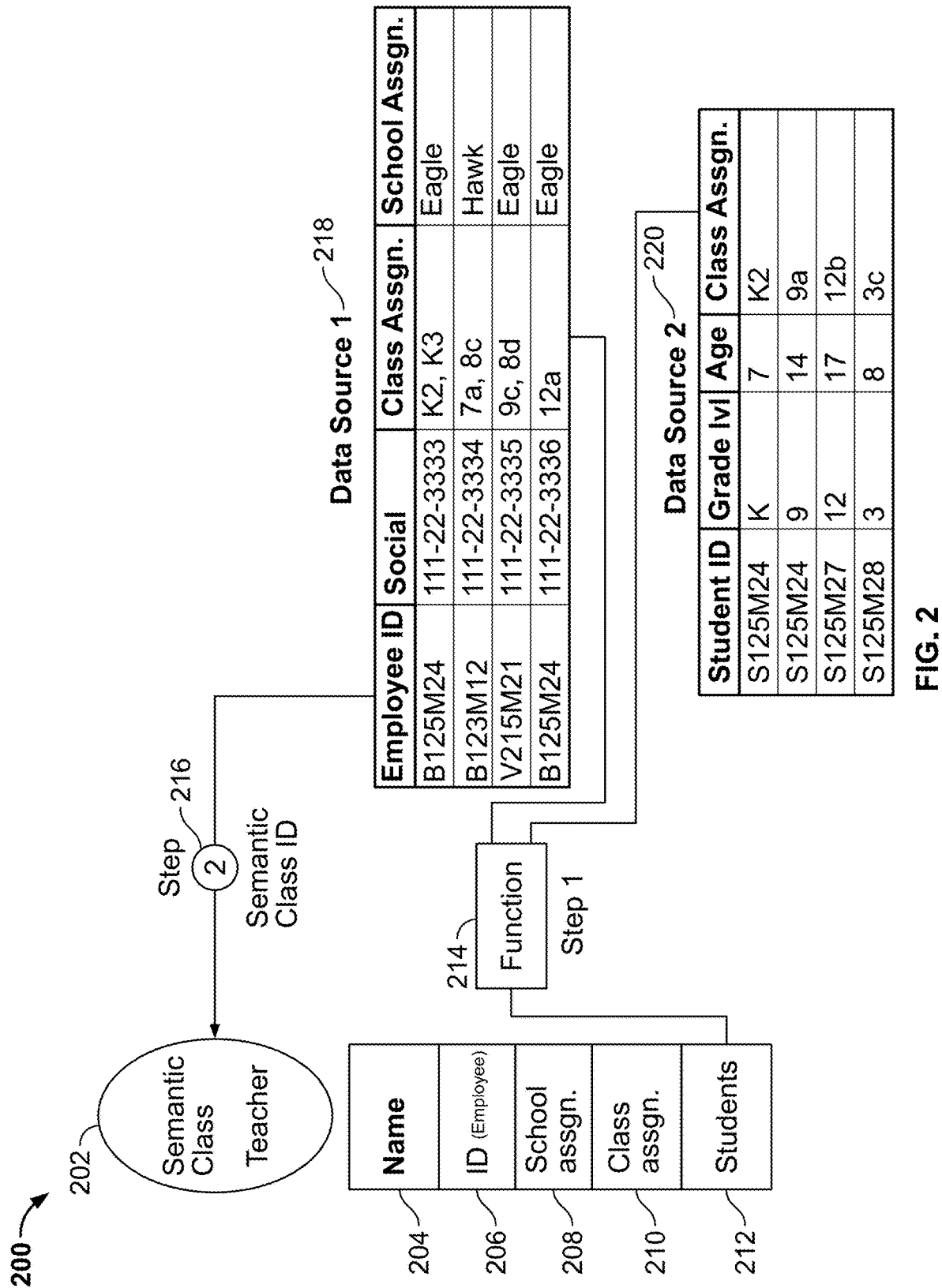
FIG. 2 shows another illustrative mapping process for creating a semantic overlay data structure, in accordance with some embodiments of the disclosure.

FIG. 2 shows another illustrative mapping process 200 for creating a semantic overlay data structure, in accordance with some embodiments of the disclosure. In some embodiments, the mapping process may be performed by the DPA. In some embodiments, semantic class 202 is the same as semantic class 102, and data source 218 is the same as data source 118.

In the shown embodiment, an inputted function 214 may be used to leverage more than one column of more than one data source to ingest data for the attribute "students" 212. For example, the DPA may adapt source fields in data sets 218 and 220 into the proper format to suit ingestion into a semantic overlay data structure. The ingestion by the DPA may be performed as 2 steps of a process (e.g., using a UI guide 120). In particular, step 1 may correspond to a selection of a semantic class and related attribute while step 2 corresponds to defining function 214 and selection of data sources for function 214. For example, function 214 may join or cross references information from different source tables in accordance with an embodiment. In the shown example, function 214 may compare class assignment for teachers from data source 218 and class assignment for students from data source 220 to create a list of teachers who study under a particular teacher. The result of the cross references can then be ingested by the DPA as list of students (or as SPARQL triples) reflecting which student studies with which teacher. Alternatively, the DPA may also search already ingested instances of semantic class "student" and add links to IDs of the matching instances to attribute "students" 212. One skilled in the art would appreciate that any suitable function may be used to transform any number of data from any number of data sources to define any attribute in semantic class 202 or in any other semantic class.

Figure 3:
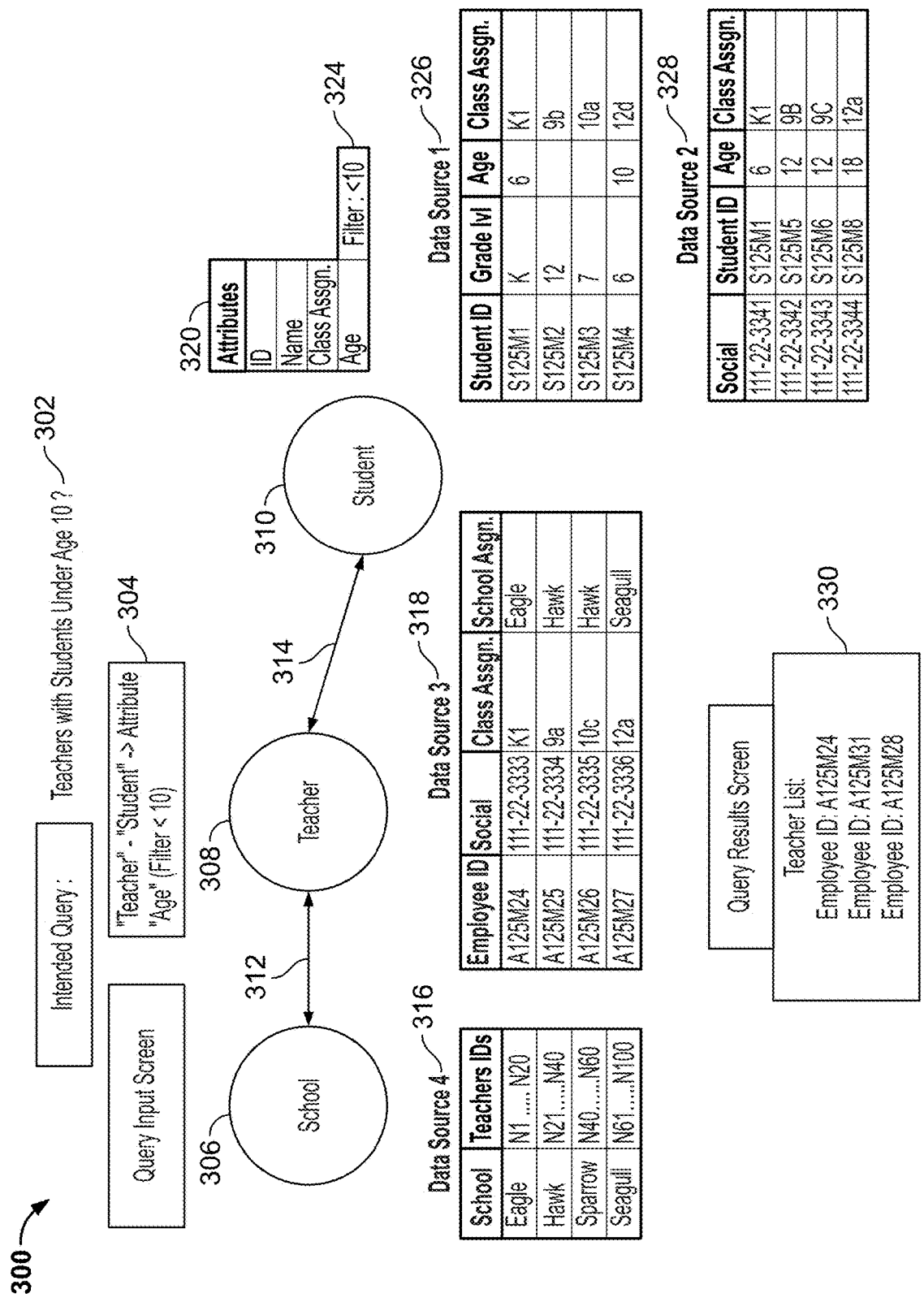
FIG. 3 shows an example of generation of query visualization, in accordance with some embodiments of the disclosure.

FIG. 3 shows an example of using query visualization 300, in accordance with some embodiments of the disclosure. Query visualization 300 shows an exemplary visualization of a query defined using a semantic overlay data structure that was defined using techniques described in FIGS. 1 and 2. For example, the DPA may have been used to define a semantic overlay data structure based on data sources 326, 328, 318, 316, e.g., to define a plurality of semantic classes (e.g., 306, 308, 310) using techniques described in FIGS. 1 and 2 and in the '857 Publication.

For example, the semantic overlay data structure may define semantic class "school" 306, semantic class "teacher" 308, and semantic class "student" 310. The semantic class "school" 312 may be linked to semantic class "teacher" 308, and semantic class "teacher" 308 may be linked to semantic class "student" 310. The semantic overlay data structure may also include any other number of additional semantic classes and connections. Each of the of semantic classes 306, 308, 310 may include its own list of attributes. For example, the semantic overlay data structure may store attributes 320 for semantic class "student" 310. The DPA may have similarly populated attributes 320 with data from one or more of data sources 326 and 328. For example, the attribute "Age" may have been mapped to column 3 of data source 326 and to column 3 of data source 328 using techniques described in FIGS. 1 and 2 and in the '857 Publication. Similarly, attributes for semantic class 308 may have been populated using data of data source 318 and any other data sources. Similarly, attributes for semantic class 306 may have been populated using data of data source 316 and any other data sources.

Once the data for semantic classes 306, 308, 310 is ingested by the DPA, a user interface (e.g. UI 120 of FIG. 1) may be used to enter a query. For example, the intent 30 of a query may be to find teachers (e.g., in all schools) who teach students under 10 years of age. User interface element 304 may be used to construct a search query that relies on the semantic overlay data structure. Advantageously, the search can be constructed using intuitive input rather than constructing an SQL query that needs to access all of data sources 316, 318, 326, 328. Instead, user interface 304 receives input that identifies semantic class "teacher" 306, and related semantic class "student." Optionally user interface 304 receives data that includes an indication of semantic class "school" 306. In some embodiments, user interface 304 may also be used to input a filter for some or all attributes of inputted semantic classes. For example, user interface 304 may be used to define a filter for attribute age being less than 10. In some implementations, the input of semantic classes, attributes, and filters may be entered sequentially resulting in sequential changes in visualization 300 (for example identifiers of semantic classes may appear when the associated semantic classes are added to the query). In some embodiments, the query may be converted by the DPA into triples-based query language (e.g., SPARQL) that may operate over the triples (e.g., triples compatible with the SPARQL queries) created during the data ingestion as described above.

The DPA may be used to construct visualization shown in FIG. 3. For example, the DPA may generate for display identifiers (e.g., circles) for each of the semantic classes 306, 308, 310 and connections 312 and 314 between classes. The visualization may be transmitted for display to a remote user device (e.g., the same device that provided UI input via screen 304). For example, the visualization may be based on the previously constructed overlay data structure that, in turn, abstracts information from data sources 316, 318, 326, and 328 (e.g., by converting traditional tabular data into a set of semantic triples). The DPA may search the set of generated sematic triples (e.g., using SPARQL queries) for data that matches the defined input and generate for display (e.g., by transmitting to a user device) results 330 that list ID's of teachers that teach students under the age of 10.

In one approach, after input is received (e.g., via input 304) the DPA automatically (e.g., without user interface input explicitly requesting the analysis) begins to compute statistic scores for all data sources that were used by the DPA during ingestion of data for semantic classes, connections, and attributes referenced by the query. For example, the DPA may begin analyzing data sources 316, 318, 326, 328 to compute statistic scores. The DPA may also compute statistic scores for each referenced semantic class and attribute. Exemplary techniques for computing the statistic scores are described in FIGS. 4-6. In another approach, the statistical analysis may begin in response to user interface input requesting analysis, e.g., a button press may be received on a button labeled "check for problems" or "troubleshooting." In some embodiments, the user interface input for requesting analysis may be generated for display by the DPA based on preliminary statistical analysis. For example, the user interface input for requesting problem analysis may appear if the number of results 330 is zero or very low (e.g., if less than 5% of total teachers are shown) or if it's very high (e.g., if more than 95% of total teachers are shown) which indicates, for example, that there is either not enough data or the filter is not functioning properly.

In another approach, the statistic scores may have been pre-computed, e.g., at the time of data ingestion. In one approach, statistic scores may have been calculated (and stored) during the process of construction of modification of the semantic model, e.g., during ingestion of data sources depicted in FIGS. 1 and 2. For example, the DPA may have computed the statistic scores for data sources 118, 218, 220, for sematic classes 102 and 202, for attributes 104-112 and 204-21, and for combinations of attributes and data sources. The statistic scores may have been stored by the DPA such that they are easy to retrieve (e.g., each semantic class and each attribute may be linked to associated statistic scores). In such embodiments, as the query is being constructed, the DPA simply access pre-computed statistic scores instead of calculating them. For example, the statistic scores may be accessed after the full query is entered, or gradually as the query is being constructed. Once accessed, the statistic scores may be used in the same way as newly computed scored described above.

Figure 4:
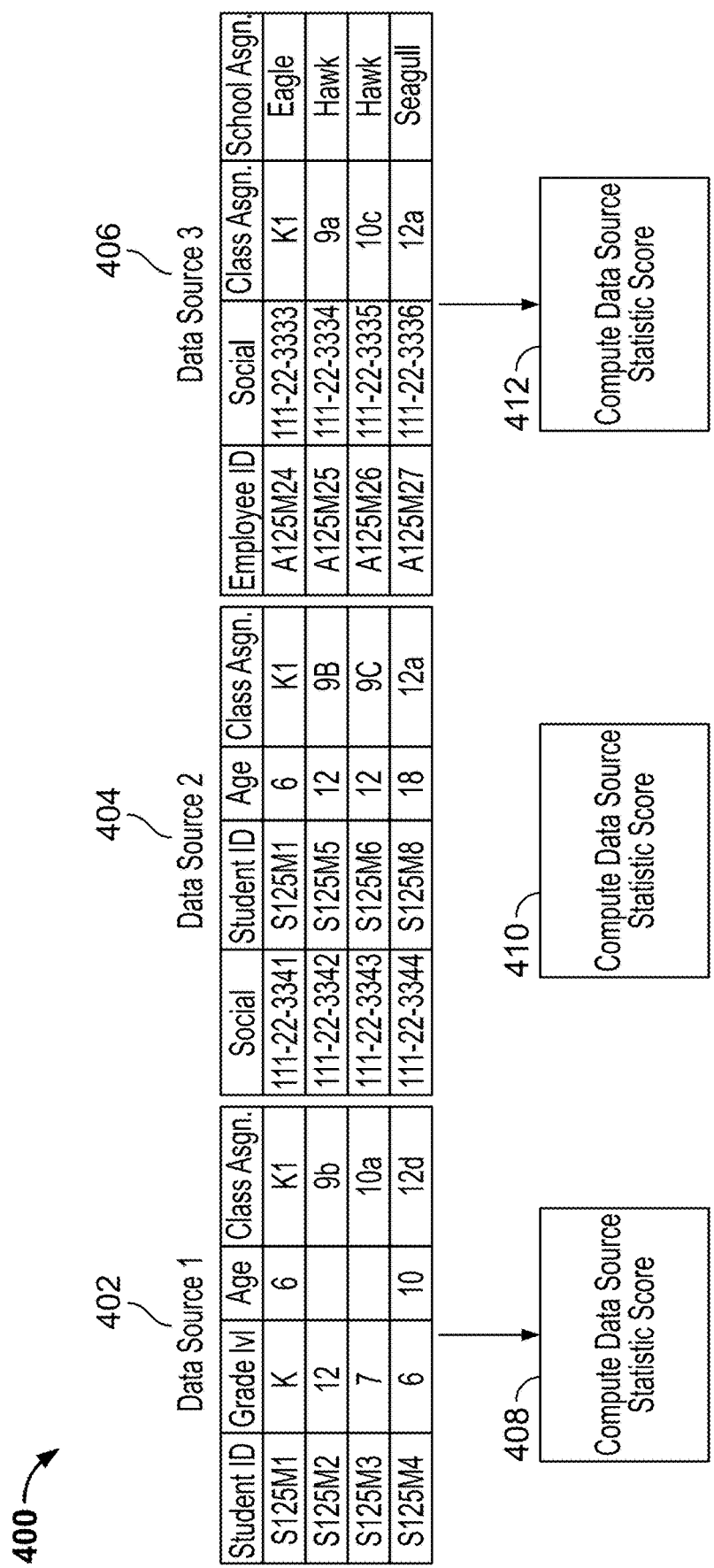
FIG. 4 shows an exemplary diagram for computing statistic scores, in accordance with some embodiments of the disclosure.

FIG. 4 shows an exemplary diagram 400 for the DPA computing statistic scores, in accordance with some embodiments of the disclosure. For example, at steps 408, 410, and 412 the DPA computes statistic scores for each of the data sources that were invoked by query 304 to determine quality of the data sources 402, 404, 406 (which may be the same as data sources 316, 318, 326, 328 of FIG. 3). For example, the DPA may compute a number of attribute instances that originate from each data source. A low number of attributes instance (e.g., below a preset or dynamic threshold) may indicate a problem with the data source. In another example, the DPA may retrieve a number of sample values (e.g., 5) for each attribute that originated from this data source.

In some embodiments, when a column of a data source is mapped to an attribute, the DPA computes a percentage of the column has defined or valid values. A low percentage or low ratios of valid column fields (e.g., lower than a pre-defined threshold such as 15% or 50%) may indicate a problem with the data source. For example, age column of data source 402 may be only 50% full of data values, which may be used by the DPA to indicate a problem with the data source 402. Advantageously, the DPA may compute statistic scores for each of the data sources 402, 404, and 406 simultaneously or in quick succession. The DPA may also compute any other suitable statistic score for any of the data sources. As explained above, the statistic scores may be computed on ingestion and/or after the query is inputted.

Figure 5:
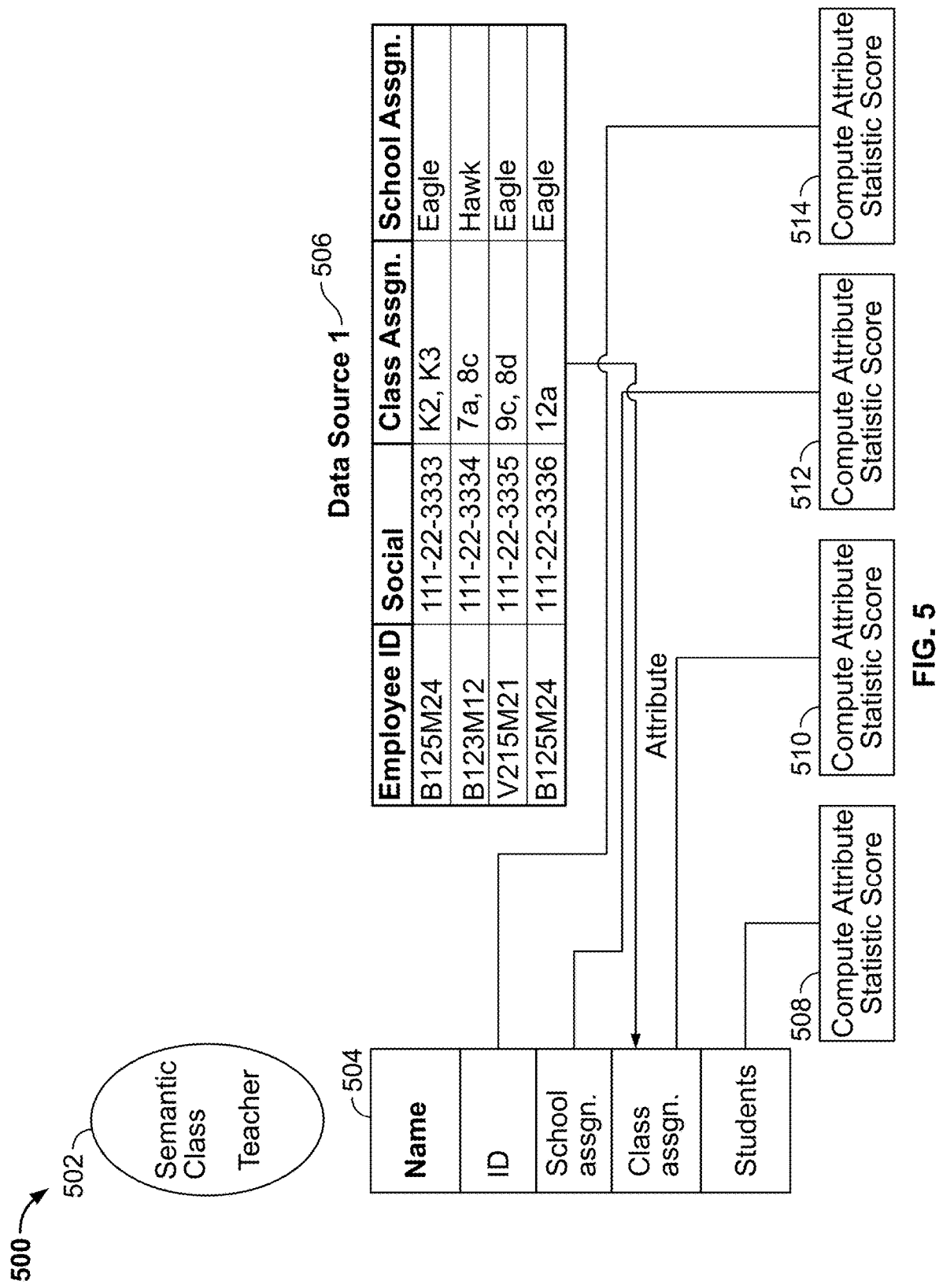
FIG. 5 shows another exemplary diagram for computing statistic scores, in accordance with some embodiments of the disclosure.

FIG. 5 shows an exemplary diagram 500 for the DPA computing statistic scores, in accordance with some embodiments of the disclosure. For example, at steps 508, 510, 512 and 514 the DPA computes statistic scores for each attribute that was invoked by query 304 to determine a quality for each of the attributes 504 (which may be the same as attributes 320 of FIG. 3). For example, the DPA may compute whether the attribute has been mapped to any data source at all. Lack of the mapping may indicate a problem with the data source. In another example, the DPA may compute a number of sources that were used to map an attribute. For example, if only data source 506 was used to map attribute "class assignment," the score would be 1. If two data sources 326 and 328 of FIG. 3 were used to map attribute "class assignment," the score would be 2. A high number of data sources (e.g., higher than a threshold, such as 5) may indicate a problem because there is a high possibility of duplicative data.

In another example, the DPA may compute a total number of attribute instances for each attribute. In another example, the DPA may compute a percentage or ratio of populated semantic class attributes versus total number of semantic class instances. Each of these scores may be compared to a threshold to identify a problematic attribute. The DPA may also compute any other suitable statistic score for any of the attributes.

The DPA may also compute statistic scores for clusters of attributes, e.g. to identify a polarity problem related to an attribute. For example, the DPA may first set a flag with a "Yes" or "No" value for all properties of a semantic class indicating whether or not an attribute is part of a cluster. Statistics may then be aggregated based on the flag. In one approach, the DPA computes a percentage or ratio of semantic class instances adhering to each attribute cluster pattern. The DPA also generates a list of data sources connected to attribute instances adhering to each semantic class cluster pattern. The DPA also extracts a number (e.g., 5) sample values of semantic class ID, for each semantic class cluster pattern.

The DPA may also compute statistic scores for each combination of attribute and each data sources that was used for data ingestion for that attribute. For example, if three different sources were used to define data for teacher names attribute in attribute 504, three respective sets of statistic scores may be computed for each combination of attribute "Teacher Name" and data sources 1 506, data sources 2 and data sources 3 (not shown). In this way, the DPA may compute, for example, what % of instances attribute "Teacher Name" are populated using which data source.

In another embodiment, the DPA may compute what percentage or what ratio of sematic class instances "Teacher" have the attribute "name" populated. Same data may be computed for each attribute (e.g., what percentage or what ratio of sematic class instances "Teacher" have the attribute "ID" populated). Such base statistic scores may be used to create more advanced scores, e.g., the DPA may compare which attributes are better or worse populated in comparison to other attributes. For example, if the attribute "name" is populated in 95% sematic class instances "Teacher" while the attribute "ID" is populated in 5% sematic class instances "Teacher," the DPA may detect a problem. One skilled in the art would appreciate that the DPA may use any combination of base statistic scores to create more advanced statistic scores (e.g., by comparing the base statistic scores, or identifying outlier base statistic scores among other base scores for attributes or for combination of attributes and data sources). For example, the DPA may use any known statistic technique (e.g., computation of mean, average, standard deviation or variance) to compute more advanced suitable statistic scores. As explained above, the statistic scores may be computed on ingestion and/or after the query is inputted.

Figure 6:
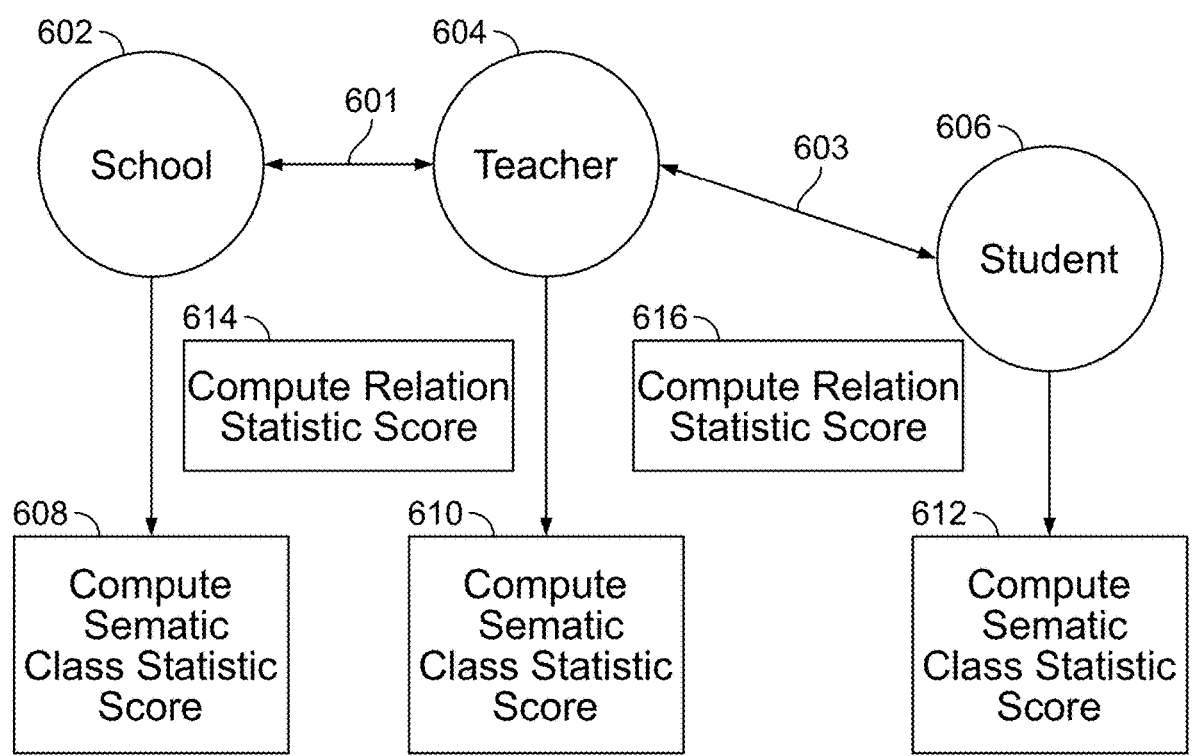
FIG. 6 shows yet another exemplary diagram for computing statistic scores, in accordance with some embodiments of the disclosure.

FIG. 6 shows an exemplary diagram 600 for the DPA computing statistic scores, in accordance with some embodiments of the disclosure. For example, at steps 608-612 the DPA computes statistic scores for each semantic class that was invoked by query 304 to determine quality for each of the semantic classless 602-606 (which may be the same as semantic classes 306-310 of FIG. 3). In another example, at steps 614 and 616, the DPA computes statistic scores for each semantic classes connection that was invoked by query 304 to determine quality for each of the connections 601 and 608 (which may be the same as connections 312 and 314 of FIG. 3).

For example, the DPA may compute a number of unique semantic class instances for each semantic class. The DPA may also compute a number of semantic class instances with values for all attributes defined by the query (e.g., query 304). The DPA may also compute a percentage or ratio of semantic class instances with values for all attributes defined by the query (e.g., query 304). The DPA may also compute a number of semantic class instances with connected relations to any adjacent class instances defined by the query (e.g., query 304). The DPA may also compute a percentage or ratio of semantic class instances with connected relations to any adjacent class instances defined by the query (e.g., query 304). Any of these statistics may be compared to corresponding thresholds to identify a problem with a semantic class instance. For example, a semantic class with a low number of instances or with a low ratio of values for all required attributes may be identified by the DPA as problematic.

In some embodiments, the DPA computes statistic scores for connections. For example, the DPA may compute a number of relationship instances where the target semantic class ID exists. The DPA may also compute total number of semantic class instances of the semantic class containing the relationship property. The DPA may also compute a total number of semantic class instances of the semantic class pointed to by the relationship property. The DPA may also compute a total number of relationship property instances. The DPA may also compute a percentage or ratio of number of connections versus number of relationship property instances. Any of these statistics may be compared to corresponding thresholds to identify a problem with a connection between semantic classes.

In some embodiments, the DPA computes statistic scores for relationship by data sources. For example, the DPA may compute a ratio of relationship connection data, defined by whether the relationship property value exists as a semantic class ID. The DPA may compute a number of semantic class instances of the semantic class containing the relationship property, by data source. The DPA may compute a number of semantic class instances of the semantic class pointed to by the relationship property, by data source. The DPA may also compute a number of relationship property instances. Any of these statistics may be compared to corresponding thresholds to identify a problem with a connection between semantic classes.

In some embodiments, the DPA may also retrieve a number (e.g., 5) of sample values of the relationship property values by data source. The DPA may also retrieve a number (e.g., 5) of the target semantic class IDs by data source. As explained above, the statistic scores may be computed on ingestion and/or after the query is inputted.

In some embodiments, some or all of statistical scores described in FIG. 4-6 may be pre-computed during ingestion of data into a semantic model. In another embodiments, the statistical scores may be computed during or after query input.

FIGS. 7A-D show exemplary user interfaces for displaying a query, in accordance with some embodiments of the disclosure. In particular, FIGS. 7A-D show exemplary embodiments of user interface that identify a problem that affects a constructed query (e.g., constructed query 304 of FIG. 3). In some embodiments, the problems are indicated by addition of user interface elements overlaid over the visualization 300 of FIG. 3.

FIG. 7A shows visualization 700 produced by the DPA in response to receiving a query defined by query input (e.g., input 304 of FIG. 3). The DPA may then cause (e.g., by transmitting visualization display instructors to a client device) the visualization to display one or more problem indicators 708, 712. The problem indicators may appear after the query is inputted or sequentially as the query is being constructed. For example, the DPA may perform steps 408-412, 508-515, 608-616 to identify statistic scores that are used to identify problems with one or more of semantic classes 702, 704, 706, attributes, connections (e.g., 708), or data sources invoiced by the search query. In one embodiment, all of the statistic scores may be computed in real-time as the query is constructed. In another embodiment the statistic scores may have been pre-computed (e.g., when data sources such as data source 776 were ingested into the semantic model). In this approach, the DPA may simply access the needed statistic scores from memory. In yet another embodiment, some statistic scores may have been precomputed, while other scores are computed in real time.

For example, the DPA may generate for display semantic class warning 714 when computed statistic scores indicate a problem with semantic class 706. In some embodiments, the DPA may generate for display semantic class warning 714 when the computed statistic scores indicate a problem with any of the attributes of the semantic class 706. In some embodiments, the semantic class warning 714 may be displayed automatically, or in response to a user interface request to identify problems with the query (e.g., as described in FIGS. 4-6). In some embodiments, semantic class warning 714 may appear anywhere in relation to the visualization or anywhere on a second screen and may take any suitable shape (e.g., a warning icon, a text box, etc.). The DPA may also generate connection warning 714 if a computed statistic scores indicates a problem with a connection (e.g., as described in FIGS. 4-6). In some embodiments, connection warning 708 may appear anywhere in relation to the visualization or anywhere on a second screen and may take any suitable shape (e.g., a warning icon, a text box, etc.). For example, warning 714 may appear due to low density of values in a data structure used to map to one of the attributes of semantic class 706 (as will be explained in more detail with respect to FIGS. 7B and 7C).

In some embodiments, the DPA may receive a user interface interaction (e.g., a click or a tap) with one or more of warning 714 and 708. For example, the user may click or tap on the one or more of warning 714 and 708. If warning 708 is clicked, the DPA may generate for display additional information based on the statistic scores that causes the identification of a problem. For example, the DPA may generate for display a percentage of connection instances that do not point to an appropriate semantic class ID. The DPA may generate for display sample values of target semantic class IDs. When warning 708 is clicked, the DPA may generate for display user interface elements shown in FIG. 7B.

Visualization 750 shown in FIG. 7B. may appear on a same screen as visualization 700 or on a different screen. For example, visualization 750 may add a display of a list of attributes 754 for semantic class "Student" 752. In the shown example, the DPA determines that attribute "age" 758 is problematic (e.g., because it includes a low density of data). In this case, attribute warning is shown next to attribute "age" 758.

Visualization 750 shown in FIG. 7C may further appear if user interaction (e.g., a click or touch) with warning 756 is received. As shown, a list of attributes 772 is shown along with full or partial view of data source 776 used to map some of the attributes 772 that were determined by the DPA to be problematic. For example, the DPA may show a warning over the column that had low density of data for attribute "age." In some embodiments, the DPA may offer suggestions on how to fix the problem. For example, the DPA may display a suggestion to map the problematic attribute to additional data sources (or to any data source if the attribute is not mapped to any data source).

Figure 7D:
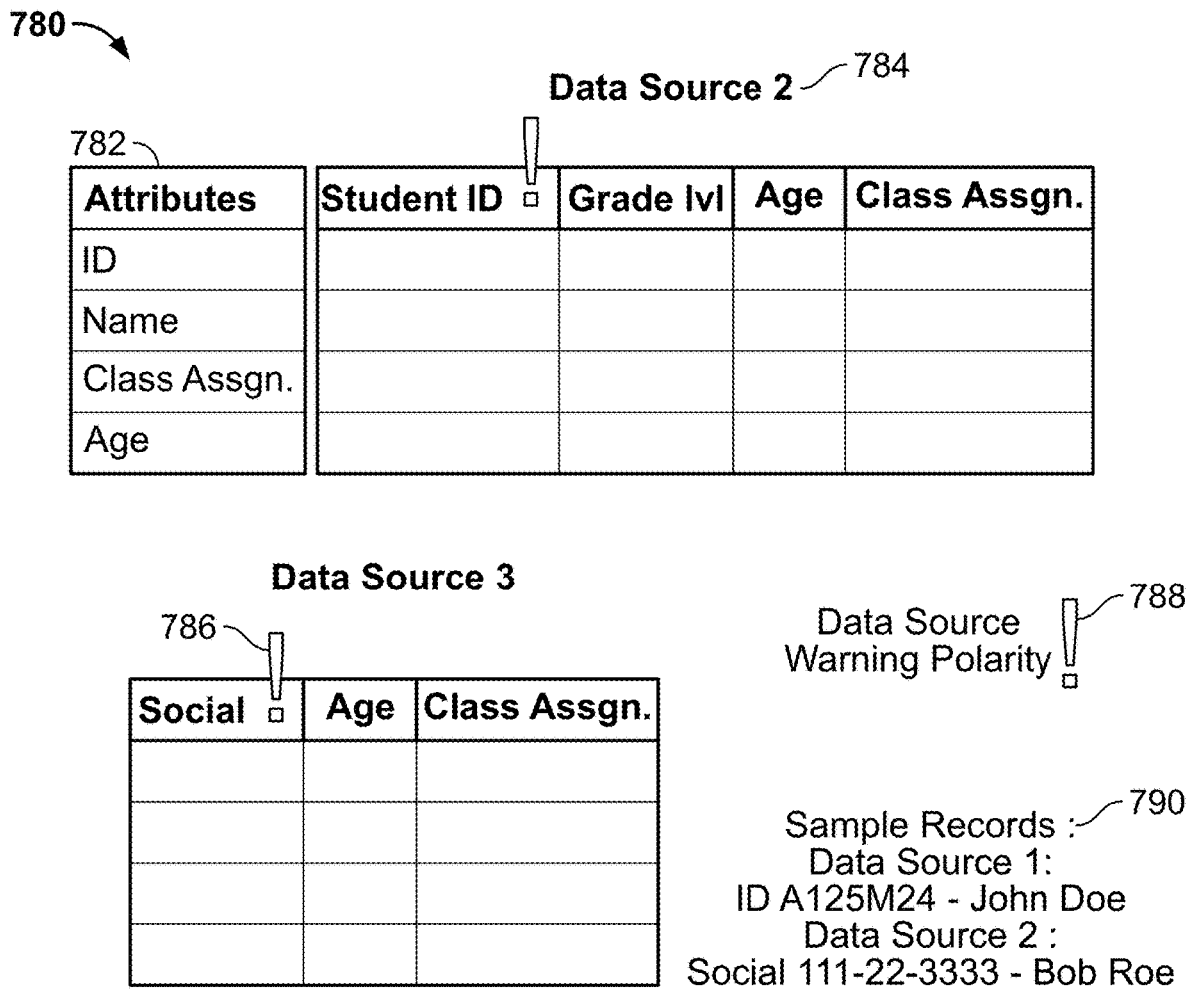
FIG. 7D shows yet another exemplary user interfaces for displaying a query, in accordance with some embodiments of the disclosure.

Visualization 780 of FIG. 7D may be generated by display by the DPA if a polarity problem was identified with data sources of the query. For example, the DPA may determine that multiple sources 784 and 786 were mapped to attribute "age" of attributes 782. For example, data source 784 may uniquely identify students by field "student ID" while data source 786 may uniquely identify students by field "Social" (which may lead to double counting of students.) Accordingly, the DPA may generate for display warnings 768 and 788 to indicate the polarity problem. The DPA may also generate for display sample records from both data sources 784 and 786 to visually indicate the difference. In some embodiments, the DPA may offer suggestions on how to fix the problem. For example, the DPA may invite changes of the choice of unique identification of students to be consistent across sources 784 and 786.

The DPA may generate warnings based on one or more of any of the problems identified by analyses described in FIGS. 4-6. The DPA may also allow for "drill down" demonstration of where the problem occurred as shown in FIGS. 7B-7D. The DPA may also show any sample values from any of the data sources at any time (e.g., automatically without a user request or in response to user request).

Figure 8:
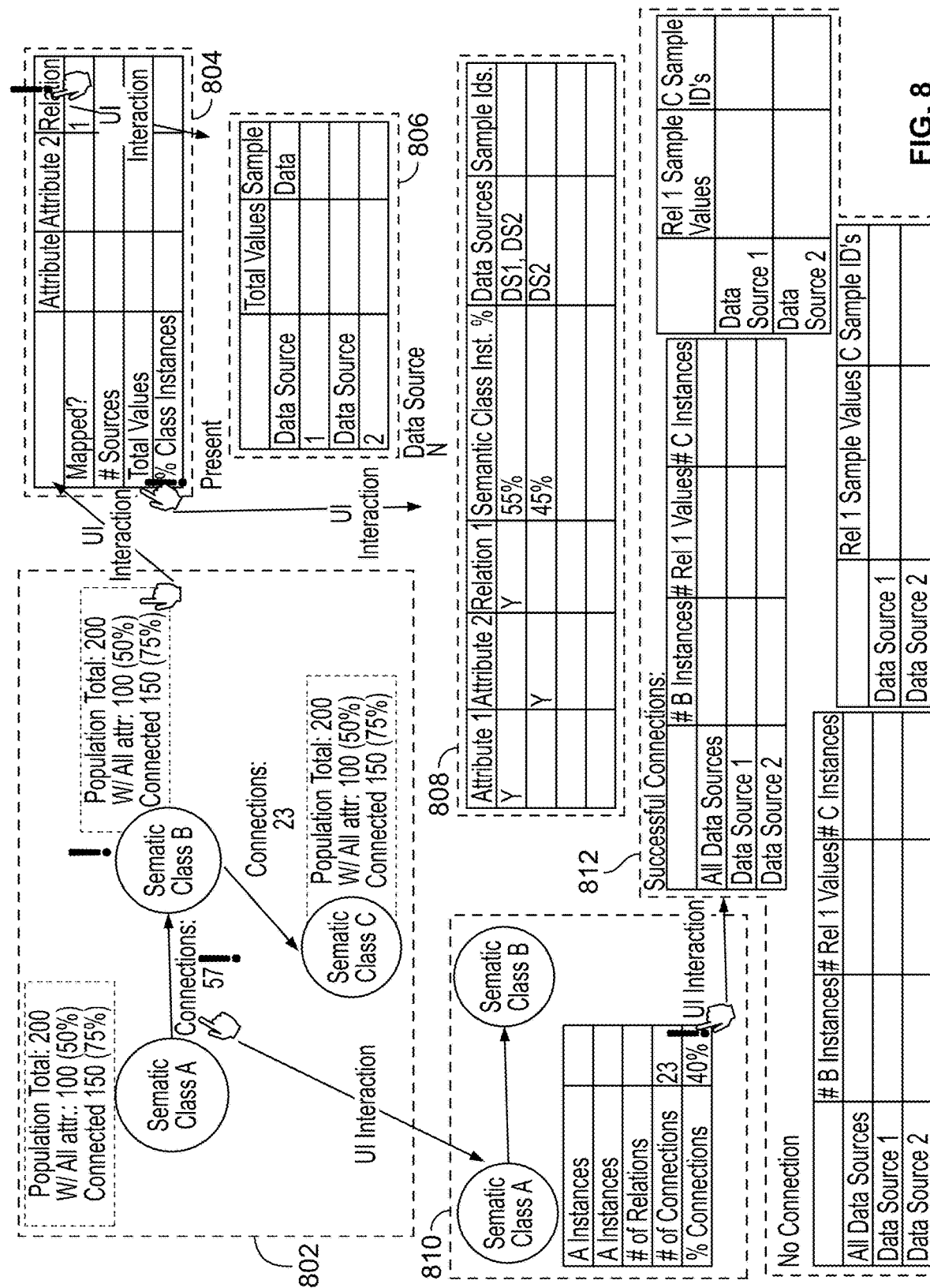
FIG. 8 shows another exemplary user interface for displaying a query, in accordance with some embodiments of the disclosure.

FIG. 8 show exemplary user interfaces for displaying a query, in accordance with some embodiments of the disclosure. In particular, FIG. 8 shows exemplary embodiments of user interface that identify a problem that affect a constructed query (e.g., constructed query 304 of FIG. 3). In some embodiments, the problems are indicated by addition of user interface elements (e.g., warning icons) overlaid over the visualization 300 of FIG. 3.

User interface 802 shows visualization produced by the DPA in response to receiving a query defined by query input. The visualization may include semantic classes A-C and connections between the semantic classes. In some embodiments, the visualization may be the same as visualization 700 in FIG. 7. The visualization may include some or all of the statistics computer for the semantic classes as discussed in FIGS. 4-6 (even if the statics do not indicate a problem). For example, visualization may include a text box for semantic class A that lists total number of instances of class A, total number of instances of class A that have data for every attribute selected by the query, a ratio or percentage of number of instances of class A that have data for every attribute selected by the query to all instances of class A. The text box may also include a total number of instances of class A that are connected to class B. The text box may also include a ratio or percentage of instances of class A that are connected to class B compared to total number of instances of class A. Classes B and C may include similar text boxes including any suitable statistic scores computed as described in relation to FIGS. 4-6.

The problem indicators may appear on the visualization after the query is inputted or sequentially as the query is being constructed. For example, the DPA may perform steps 408-412, 508-515, 608-616 to identify statistic scores that are used to identify problems with one or more of semantic classes A-C, attributes, connections, or data sources invoked by the search query. Advantageously, all of the statistic scores may be computed in real time as the query is constructed. User interface inputs may be used to interact with one or more of the problem indicators. For example, an interface interaction (e.g., a click or a touch) with a connection problem indicator many cause display pf user interface 810.

Interface 810 may include identifiers for classes that are connected by a problematic connection (e.g., semantic classes A and B). Interface 810 may also include a table constructed by the DPA that shows statistical information for the connection between semantic classes A and B. For example, the table may list number of instances of semantic class A, number of instances of semantic class B, number of relations between instances of semantic classes A and B, number of connections between instances of semantic classes A and B, and percentage of instances of semantic class A that have a connection to an instance of semantic class B. If any of the statistic scores represent a problem (e.g., by being under a threshold), a problem indicator may appear next to that statistic. For example, if the percentage of connection is below the threshold, the problem indicator may appear next to that score. A user interface interaction (e.g., a click or a touch) with a percentage of connection problem indicator may cause display of user interface elements 812 which further show what data sources were used to establish connections semantic classes A and B.

In another example, an interface interaction (e.g., a click or a touch) with a semantic class problem indicator may cause display of user interface 804. User interface 804 may show a table with statistic scores for attributes and connections of semantic class B. For example, User interface 804 may show for every attribute and connection: whether it was mapped at all, to how many sources it was mapped, total number of attribute instances that have a mapping, and percentage of attributes that have a mapping compared to a total number of attribute instances. Any other suitable attribute statistic score may also be shown. A problem indicator may be shown on user interface 804 to identify an attribute which is problematic. A user interface interaction (e.g., a click or a touch) with an attribute problem indicator may cause display of user interface elements 806. Interface elements 806 may show, for the selected attribute, total values mapped from each mapped data sources, as well as sample data from the data sources.

A problem indicator may be shown on user interface 804 to identify a polarity problem. A user interface interaction (e.g., a click or a touch) with an attribute problem indicator may cause display of user interface elements 808. User interface elements 808 may comprise a table showing data indicative of polarity problem for one or more attribute or relation such as reliance on multiple data's sources with different ways to uniquely identify a key semantic class.

Figure 9A:
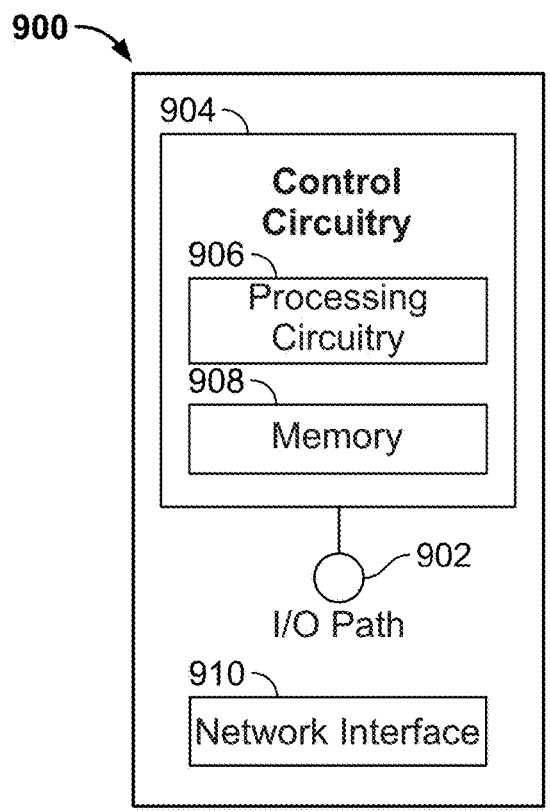
FIG. 9A shows a diagram of an illustrative device for performing data analysis and query user interface presentation, in accordance with some embodiments of the disclosure.

FIG. 9A shows a generalized embodiment of a device usable to provide data processing and visualization as described above and below. In particular, device 900 of FIG. 9 may be any of the devices that perform steps described in FIGS. 1-8. Device 900 may receive data via data network interfaces 910 and provide the received data to control circuitry 904 via an input/output (I/O) path 902. Control circuitry 904 includes processing circuitry 906 and storage 908. Storage 908 may include volatile memory 930 (such as random-access memory (RAM), for example, static RAM and/or dynamic RAM), which does not retain its contents when power is turned off, and non-volatile memory 908 (such as, for example, a solid state drive (SSD), a hard disk drive (HDD), electrically erasable programmable read-only memory (EEPROM), etc.), which does retain its contents when power is turned off. Control circuitry 904 may send and receive commands, requests, and other suitable data using I/O path 902. As noted above, I/O path 902 connects control circuitry 904 (and specifically processing circuitry 906) to network interface 910, which in turn connects device 900 to one or more other devices. For example, I/O path 902 may be used by one or more servers to received local or remote user interface input and provide visualization output to remote devices.

Control circuitry 904 may be based on any suitable processing circuitry, such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 904 executes instructions suitable to implement any of the techniques described above or below.

Storage 908 may be an electronic storage device that is part of control circuitry 904. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 908 may include a set of instruction, that when executed by control circuitry 904 result in execution and operation of the DPA as described by FIGS. 1-8. In some embodiments, device 900 mat comprise user interface circuitry for receiving user input (e.g., via keyboard, mouse, touch screen or any other suitable user input device). user interface circuitry may provide input data to control circuitry 904.

Figure 9B:
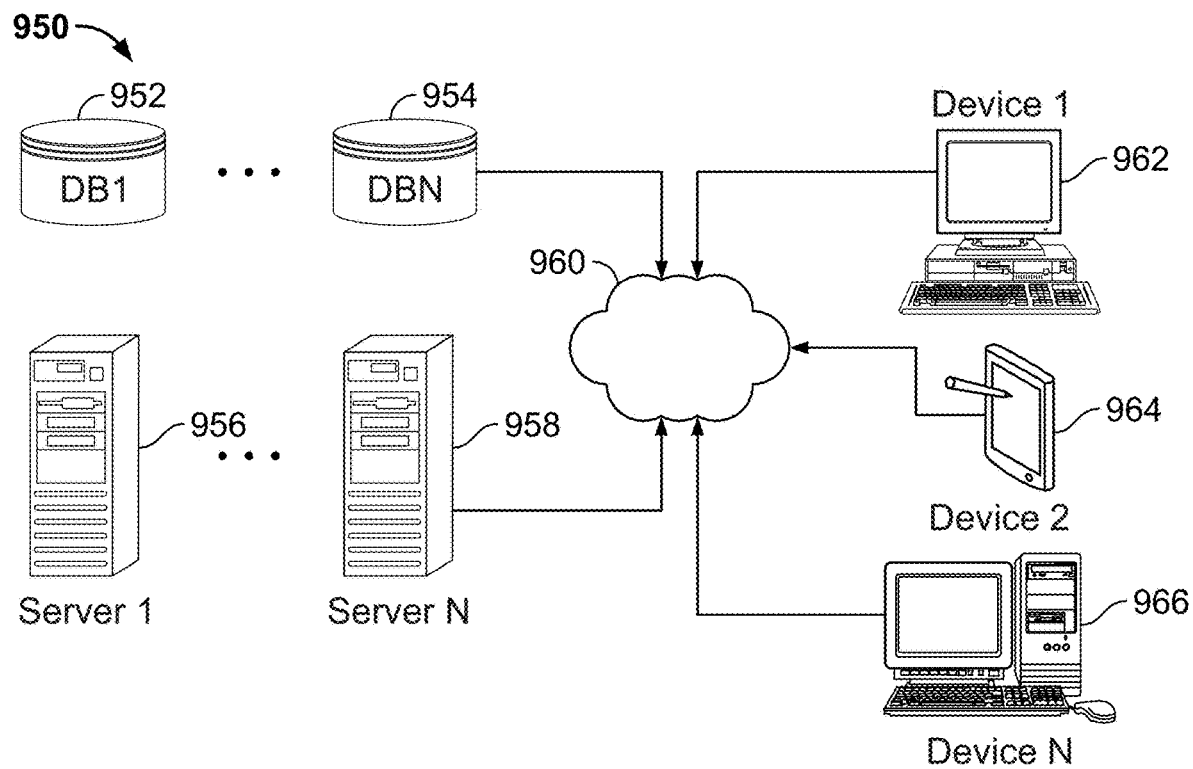
FIG. 9B shows a diagram of an illustrative system for performing data analysis and query user interface presentation, in accordance with some embodiments of the disclosure.

FIG. 9B shows a diagram of an illustrative system 950 for performing data analysis and user interface presentation, in accordance with embodiments described in FIGS. 1-8. For example, system 950 includes any number of servers 956-958 that may be configured to perform all aspects of the DPA as described as above and below. For example, the DPA may be executed by any of the servers 956-958 or by a combination of servers using suitable distributed computing techniques. Servers 956-958 may be communicatively connected to any number of databases 952-954 by local connection or via network 960. Network 960 nay be any kind of a suitable network, such as Internet, intranet, private network, virtual network, cellular network, or any combination the above.

System 950 may include any number of client devices 962-966 (e.g., PCs, computers, smartphones, laptops, PDA or any other suitable computer devices). Client devices 962-966 may be configured to interface with servers 956-958 via network 960. Client devices 962-966 may be configured to provide UI input to servers 956-958, e.g., to define the semantic overlay data structure for tadeonal data sources (e.g., stored on Databases 952-954). Client devices 962-966 may be configured to provide query input to the DPA executing on servers 956-958. Client devices 962-966 may be configured to received output provided the DPA executing on servers 956-958. For example, client devices 962-966 may display visualizations and query results provided the DPA generated for display by servers 956-958 via network 960. Each of devices 962-966, 956-958, and 952-954 may comprise hardware as shown by FIG. 9A and/or any other suitable hardware.

Figure 10:
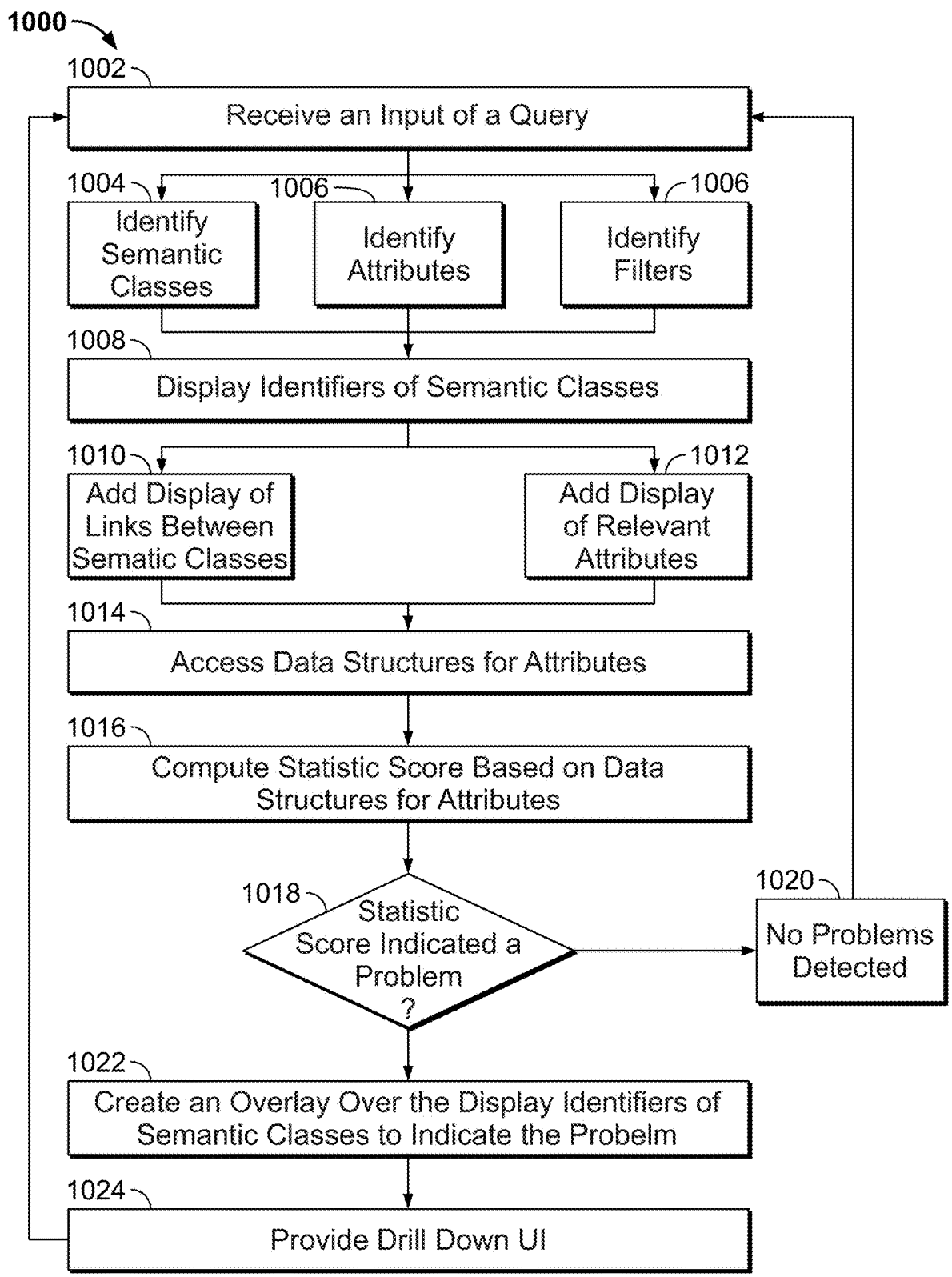
FIG. 10 is a flowchart of an illustrative process for data analysis and user interface presentation, in accordance with some embodiments of the present disclosure.

FIG. 10 is a flowchart of method 1000 for data analysis and user interface presentation, in accordance with some embodiments of the present disclosure. Process 1000 may be performed by physical or virtual control circuitry, such as control circuitry 904 of device 900 of FIG. 9 or any of devices 956-958 of FIG. 9.

At 1002, the control circuitry of one of the servers (e.g., control circuitry of 904 one of servers 956-958) may receive an input of a query (e.g., input created via user interface circuitry of device 900). For example, the query may be received via user interface generated for display on any of devices 962-966 and transferred to the control circuitry via a network (e.g., network 960) and accessed by network interface (e.g., network interface 910). The query may include a plurality of semantic classes defined by a semantic model data structure that defines at least one attribute for each of the plurality of semantic classes and at least one link between semantic classes of the plurality of semantic classes, and wherein the semantic model data structure maps the at least one attribute to an at least one respective source data structure. For example, the semantic model data structure may have been defined as described in FIGS. 1 and 2.

At 1004-1006, the control circuitry may identify semantic classes, attributes, and filters defined by the query received at step 1002.

At 1008, the control circuitry may generate for display a visual representation of the query, the visual representation may include an identifier for each semantic class identified in step 1004. The visual representation may be the same as shown in FIGS. 3, 7 and 8. At 1010 the control circuitry may generate for display links between classes (e.g., links 601 and 603 of FIG. 6). Optionally, at 1012, the control circuitry may generate a view of an identifier for the at least one attribute (e.g., as shown by element 320 of FIG. 3)

At 1014, the control circuitry may access data structures that were mapped to attributes (and/or connections) defined by query received at step 1002. The data structures may be stored locally or on remote device accessible via network (e.g., on devices 922-954 accessible via network 960).

At 1016, the control circuitry may compute at least one statistic score, for example, based on calculating a number of records in the at least one source data structure comprising a value for the at least one attribute. In some embodiments, any suitable statistic scores may be computed in any suitable manner (e.g., as discussed in FIGS. 4-6). In some embodiments, at least one source data structure comprises a table with a column comprising values for the at least one attribute. In some embodiments, the control circuitry may access any suitable statistic scores that was pre-computed ahead of time instead of computing the at least one statistic score. At 1018, the control circuitry may check if any of the statistic scores indicates a problem. If not, the process may proceed back to 1002 via step 1020 and await a modification to the query. If any of the statistic scores indicates a problem, process 1000 may continue at 1022.

An attribute may be designated as problematic based on the control circuitry analyzing at least one statistic score. The control circuitry may then identify a problematic semantic class in the query that is associated with the problematic attribute and generate for display a visual overlay over the visual representation of the query that visually distinguishes an identifier of the problematic semantic class from the other identifiers of the semantic class of the query. For example, the semantic class may be modified to have a different color or to include a warning icon.

At 1022, the control circuitry may modify the visual representation of the query based on identifying a problematic attribute in the query based on the at least one statistic score. For example, any of the problem indictors of FIGS. 7 and 8 may be generated for display. In some embodiments, the control circuitry may transmit modification of the visual representation of the query (e.g., with problem indictor) to a remote device from which query was received in step 1002 (e.g., over network 960). In some embodiments, the modification may be performed automatically in response to the identifying the problematic attribute. In some embodiments, the modification may be performed in response to a user interface input requesting troubleshooting of the query (e.g., a button or click field). In some embodiments, control circuitry may provide drill down interface at step 1024 as shown in FIG. 8.

In some embodiments, the control circuitry may designate at least one attribute of as the problematic attribute by determining that the semantic model data structure comprises at least two duplicative semantic classes instances. For example, the control circuitry may determine that duplicative semantic classes exist due to a polarity problem. For example, the control circuitry may determine that instances of a certain semantic classes were created based on differently formatted data sources that led to creating of duplicative semantic classes instances. In on example, one data sources may have used an ID column to uniquely identify teachers, while another data sources may have used a Social Security Number column to uniquely identify teachers. In this example, two semantic instances may have been created for the same teacher, one based on his ID and one based on his Social Security Number. In this example, the control circuitry may designate "ID" and "Social Security Number" attributes as problematic (e.g., due to an identified polarity problem). In some example, the control circuitry generates for simultaneous display: (a) a sample record of the problematic source data structure mapped to the problematic attribute, and (b) a sample record of the another source data structure mapped to the problematic attribute (e.g., as shown in FIG. 8 in element 808).

In some embodiments, the control circuitry may modify the visual representation of the query such that it distinguishes an identifier of the problematic attribute from other identifiers of attributes of the query (e.g., by showing an icon next to a problematic attribute). In some embodiments, the control circuitry may modify the visual representation of the query by generating for display an identification of a problematic source data structure mapped to the problematic attribute (e.g., as showing in FIG. 8 in element 806.). In some embodiments, the control circuitry may generate for display a sample record of the problematic source data structure (e.g., as shown in FIG. 8 in element 806).

In some embodiments, the control circuitry may modify the visual representation by accessing at least one connection data structure for least one connection between semantic classes of the query to compute at least one statistic score for the at least one connection. The control circuitry may designate at least one connection as a problematic connection by analyzing the at least one statistic scores. The control circuitry may modify the visual representation of the query by visually distinguishes a visual link associated with the problematic connection (e.g., as shown by element 708 of FIG. 7).

Figure 11:
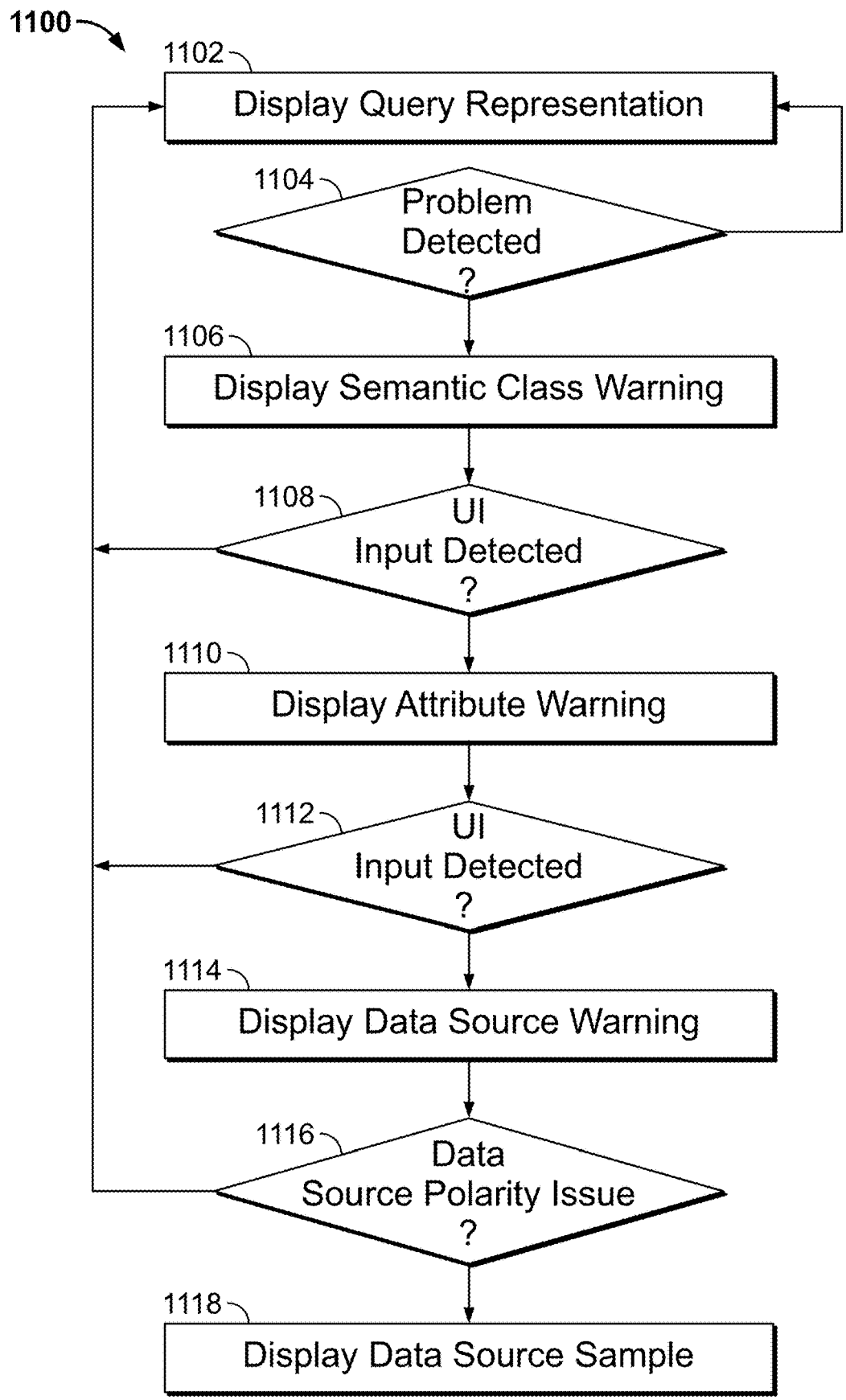
FIG. 11 is another flowchart of an illustrative process for data analysis query user and interface presentation, in accordance with some embodiments of the present disclosure.

FIG. 11 is a flowchart of method 1100 for data analysis and user interface presentation, in accordance with some embodiments of the present disclosure. Process 1100 may be performed by physical or virtual control circuitry, such as control circuitry 904 of device 900 of FIG. 9 or any of devices 956-958 of FIG. 9.

At 1102, the control circuitry of one of the servers (e.g., control circuitry of 904 one of servers 956-958) may display a query representation (e.g., using technique described in element 1022 of FIG. 1022). At 1104, the control circuitry may check if any of the semantic classes is problematic (e.g., using technique described in FIGS. 4-6). If not, process 1100 may proceed back to 1102 and await a modification to the query. If any of the statistic scores indicates a problem, process 1100 continues at 1106.

At 1106, the control circuitry may generate for display a semantic class warning (e.g., as shown in FIGS. 7 and 8). At 1108, the control circuitry checks if UI interface input is detected that indicates an interaction with the problem indicator generated at step 1106. If no input is detected, process 1100 may proceed back to 1102 and await a modification to the query. If the UI interface input is detected process 1100 continues at 1110.

At 1110, the control circuitry may generate for display an attribute warning (e.g., as shown in element 804 of FIG. 8). At 1112, the control circuitry checks if UI interface is detected and that indicates interaction with the problem indicator generated at step 1110. If no input is detected, process 1100 may proceed back to 1102 and await a modification to the query. If the UI interface input is detected, process 1100 continues at 1114.

At 1114, the control circuitry may generate for display a data source warning (e.g., as shown in element 806 of FIG. 8). At 1116, the control circuitry may perform a check for a polarity problem (e.g., as described in relation to FIG. 8). If no polarity problem is found, process 1100 may proceed back to 1102 and await a modification to the query. If the polarity problem is detected process 1100 continues at 1118. At 1118, the control circuitry displays data source samples, e.g., as show in element 808 of FIG. 8.

While the processes 1000 and 1100 described above illustrate a single iteration of the operations to analyze data and display problem indicators on a user interface, those skilled in the art will appreciate that these processes may be iteratively repeated. The processes 1000 and 1100 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any suitable other embodiment herein, and flowcharts or examples relating to one embodiment may be combined with any other suitable embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that systems and methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
receiving an input of a query, wherein the query comprises: (a) a plurality of semantic classes defined by a semantic model data structure that defines at least one attribute for each of the plurality of semantic classes, and (b) at plurality of links between a semantic classes of the plurality of semantic classes, and wherein the semantic model data structure maps the at least one attribute to at least one respective source data structure;
generating for display a visual representation of the query, the visual representation comprising: an identifier for each semantic class, identifiers for a subset of the plurality of links, and an at least one identifier for the at least one attribute;
accessing at least one source data structure mapped to the at least one attribute to access at least one statistic score;
designating at least of the plurality of links as a problematic link based on analyzing the at least one statistic score; and
modifying the visual representation of the query based on identifying the problematic link in the query based on the at least one statistic score, wherein the modifying comprises generating for display a visual overlay over the visual representation of the query that visually distinguishes an identifier of the problematic link from other identifiers of links of the plurality of links, wherein the modifying is performed automatically without user interface input explicitly requesting the analysis.

2. The method of claim 1, wherein the at least one source data structure comprises a table with a column comprising values for the at least one attribute.

3. A method of claim 1, wherein the visual overlay over the visual representation of the query additional visually distinguishes an identifier of a problematic attribute from other identifiers of the at least one attribute of the query.

4. A method of claim 1, further comprising:
generating for display an identification of a problematic source data structure of the at least one respective source data structures.

5. A method of claim 4, further comprising:
generating for display a sample record of the problematic source data structure.

6. A method of claim 1, wherein designating at least of the plurality of links as the problematic link is based on determining that a threshold ratio of link instances of the problematic link do not point to an appropriate semantic class of the plurality of semantic classes.

7. A method of claim 6, further comprising:
based on a user interface interaction with the visual overlay:

generating for display at least one sample value of a target semantic class identified by the problematic link.

8. A system comprising:
an Input/Output circuitry configured to:
receive an input of a query, wherein the query comprises:
(a) a plurality of semantic classes defined by a semantic model data structure that defines at least one attribute for each of the plurality of semantic classes, and
(b) at plurality of links between a semantic classes of the plurality of semantic classes, and wherein the semantic model data structure maps the at least one attribute to at least one respective source data structure; and
a control circuitry configured to:
generate for display a visual representation of the query, the visual representation comprising: an identifier for each semantic class, identifiers for a subset of the plurality of links, and an at least one identifier for the at least one attribute;
access at least one source data structure mapped to the at least one attribute to access at least one statistic score;
designate at least of the plurality of links as a problematic link based on analyzing the at least one statistic score; and
modify the visual representation of the query based on identifying the problematic link in the query based on the at least one statistic score, wherein the modifying comprises generating for display a visual overlay over the visual representation of the query that visually distinguishes an identifier of the problematic link from other identifiers of links of the plurality of links, wherein the modifying is performed automatically without user interface input explicitly requesting the analysis.

9. The method of claim 8, wherein the at least one source data structure comprises a table with a column comprising values for the at least one attribute.

10. A method of claim 8, wherein the visual overlay over the visual representation of the query additional visually distinguishes an identifier of a problematic attribute from other identifiers of the at least one attribute of the query.

11. A method of claim 8, wherein the control circuitry is further configured to:
generate for display an identification of a problematic source data structure of the at least one respective source data structures.

12. A method of claim 11, wherein the control circuitry is further configured to:
generate for display a sample record of the problematic source data structure.

13. A method of claim 8, wherein designating at least of the plurality of links as the problematic link is based on determining that a threshold ratio of link instances of the problematic link do not point to an appropriate semantic class of the plurality of semantic classes.

14. A method of claim 13, wherein the control circuitry is further configured to:
based on a user interface interaction with the visual overlay:
generate for display at least one sample value of a target semantic class identified by the problematic link.

* * * * *